(12) United States Patent
Hamilton, II et al.

(10) Patent No.: US 8,085,421 B2
(45) Date of Patent: Dec. 27, 2011

(54) EFFICIENT PRINT OPERATIONS

(75) Inventors: Rick A. Hamilton, II, Charlottesville, VA (US); Brian M. O'Connell, Cary, NC (US); Clifford A. Pickover, Yorktown Heights, NY (US); Victoria L. Vogelsang, Milton, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 12/182,302

(22) Filed: Jul. 30, 2008

(65) Prior Publication Data

US 2010/0027051 A1    Feb. 4, 2010

(51) Int. Cl.
    *G06F 3/12*    (2006.01)
(52) U.S. Cl. ............ 358/1.15; 358/1.13; 358/1.14; 358/1.16
(58) Field of Classification Search .......... 358/1.13, 358/1.14, 1.15, 1.16
    See application file for complete search history.

(56) References Cited

U.S. PATENT DOCUMENTS

| | | | |
|---|---|---|---|
| 4,839,829 A | 6/1989 | Freedman | |
| 6,559,961 B1 | 5/2003 | Isernia et al. | |
| 7,310,156 B2 | 12/2007 | Watanabe et al. | |
| 7,339,691 B2 | 3/2008 | Ferlitsch | |
| 2002/0135800 A1* | 9/2002 | Dutta | 358/1.15 |
| 2007/0103714 A1* | 5/2007 | Ushiku | 358/1.14 |
| 2007/0177180 A1* | 8/2007 | Yamada et al. | 358/1.13 |

FOREIGN PATENT DOCUMENTS

WO    2005/084007    9/2005

* cited by examiner

*Primary Examiner* — Benny Tieu
*Assistant Examiner* — Juan Guillermety
(74) *Attorney, Agent, or Firm* — Patrick J. Daugherty; Driggs, Hogg, Daugherty & Del Zoppo Co., LPA

(57) ABSTRACT

A method, apparatus, and product for reducing resource footprints for printer operation outputs, comprising: specifying a print job rendering criteria; receiving a request to print a print job having a page number amount; and automatically selecting and printing a portion of the print job as a function of the print job rendering criteria, wherein the portion has a page number amount smaller than the print job page number amount. The print job rendering criteria may comprise a set maximum number of pages to print during one printing session, where the portion to print is less than or equal to the maximum number of pages. Where the print job comprises a plurality of document components, automatically selecting and printing a portion of the document may comprise selecting a subset of the plurality of components as a function of the identified component relevance to each selected component and printing the representation.

19 Claims, 3 Drawing Sheets

EFFICIENT PRINT OPERATIONS

FIELD OF THE INVENTION

The present invention generally describes means for reducing energy and resource footprints for printer operations.

BACKGROUND OF THE INVENTION

Green computing is sometimes defined as the study and practice of using computing resources efficiently. Typically, technological systems or computing products that incorporate green computing principles take into account economic viability, social responsibility, and environmental impact. A typical green computing method includes implementing environmentally friendly products, like those with the Energy Star rating, in an efficient system that maximizes energy use.

A multitude of different types of printers exist in almost every industry, including many older, inefficient models, for example including those without the Energy Star rating. Many of these inefficient printers are widely used in offices and homes, having become a standard piece of any computing system. Since printers are used so regularly, a green computing method is needed specifically to reduce the amount of excess waste that occurs during printing based on the availability and use of inefficient printers.

One goal of green computing is for computing products to create smaller carbon footprints through source reduction. A carbon footprint is the gauge of the impact that commercial activities have on the environment in terms of the amount of greenhouse gases produced. Source reduction involves the practice of creating, purchasing, and using materials in ways that reduce the amount of waste created. Known source reduction methods implemented to reduce printing tasks generally include, for example: printing only when a hard copy is needed, saving e-mails and other documents to a computer hard drive or on a diskette, reading e-mails and other documents on-line or on-screen, using the highest-quality printing setting only for final copies while using "economy" settings for drafts, and printing multiple pages per sheet. Such methods do not offer ways to reduce printer usage associated with accidental or excessive printing, or offer ways to reduce the carbon footprint of printers through reducing waste of energy and other resources associated with the unintentional printing.

Thus, there is a need for improved methods and systems that address the above problems, as well as others.

SUMMARY OF THE INVENTION

A method for reducing resource footprints for printer operation outputs, comprising: specifying a print job rendering criteria; receiving a request to print a print job having a page number amount; and automatically selecting and printing a portion of the print job as a function of the print job rendering criteria, wherein the portion has a page number amount smaller than the print job page number amount.

For some embodiments specifying the print job rendering criteria comprises setting a maximum number of pages to print during one print job printing session, wherein the portion page number amount is less than or equal to the maximum number. Other embodiments allow for dynamically revising the print job rendering criteria as a function of a resource characteristic of a printer; and revising the portion page number amount in proportion to the dynamic revising while still other embodiments allow for notifying a print job requester of a pending portion printing; and enabling the requester to override the pending portion printing and instead cause a printing of the print job or another version of the print job, the version having a page number amount divergent from the portion page number amount and the print job page number amount.

Some embodiments describe where specifying the print job rendering criteria comprises specifying a document element selection criteria, and wherein the print job comprises a plurality of document components; analyzing the print job as a function of the print job rendering criteria to identify a relevance of each of the plurality of document components to the specified document element; and automatically selecting the printing of the portion comprises creating a representation of the print job, by selecting a subset of the plurality of document components as a function of the identified component relevance of each selected component and printing the representation.

For some embodiments, specifying the print job rendering criteria comprises setting an automatic document region selection, and wherein the creating the representation comprises selecting the automatic document region selection and excluding another document region distinct from the automatic document region selection, analyzing the print job comprises mining the print job, and creating the representation comprises using the mining to select the subset of the plurality of document components as a function of document element comparison and categorization. For other embodiments, the document element is a key word or key phrase.

For some embodiments, the print job comprises a chain of a plurality of emails, and the document element is contained within a one of the chain of emails, and the representation excludes at least a one of the chain of emails. Further embodiments comprise selecting at least one of a first document page, a page last edited by the requester and a page visible to the requester on a graphical user interface application display during the request to print the print job.

In another aspect, methods are provided for deploying an application for reducing resource footprints for printer operation outputs, for example by a service provider who offers to implement, deploy, and/or perform functions for others. Still further, an article of manufacture comprising a computer usable medium having a computer readable program in said medium may be provided. Such program code comprises instructions which, when executed on a computer system, cause the computer system to perform one or more method and/or process elements for reducing resource footprints for printer operation outputs, for example as described above. Moreover, systems, articles and programmable devices configured for performing one or more method and/or process elements of the current invention for reducing resource footprints for printer operation outputs, for example as described above, are also provided.

BRIEF DESCRIPTION OF THE DRAWINGS

These and other features of this invention will be more readily understood from the following detailed description of the various aspects of the invention taken in conjunction with the accompanying drawings in which.

Figure 1:
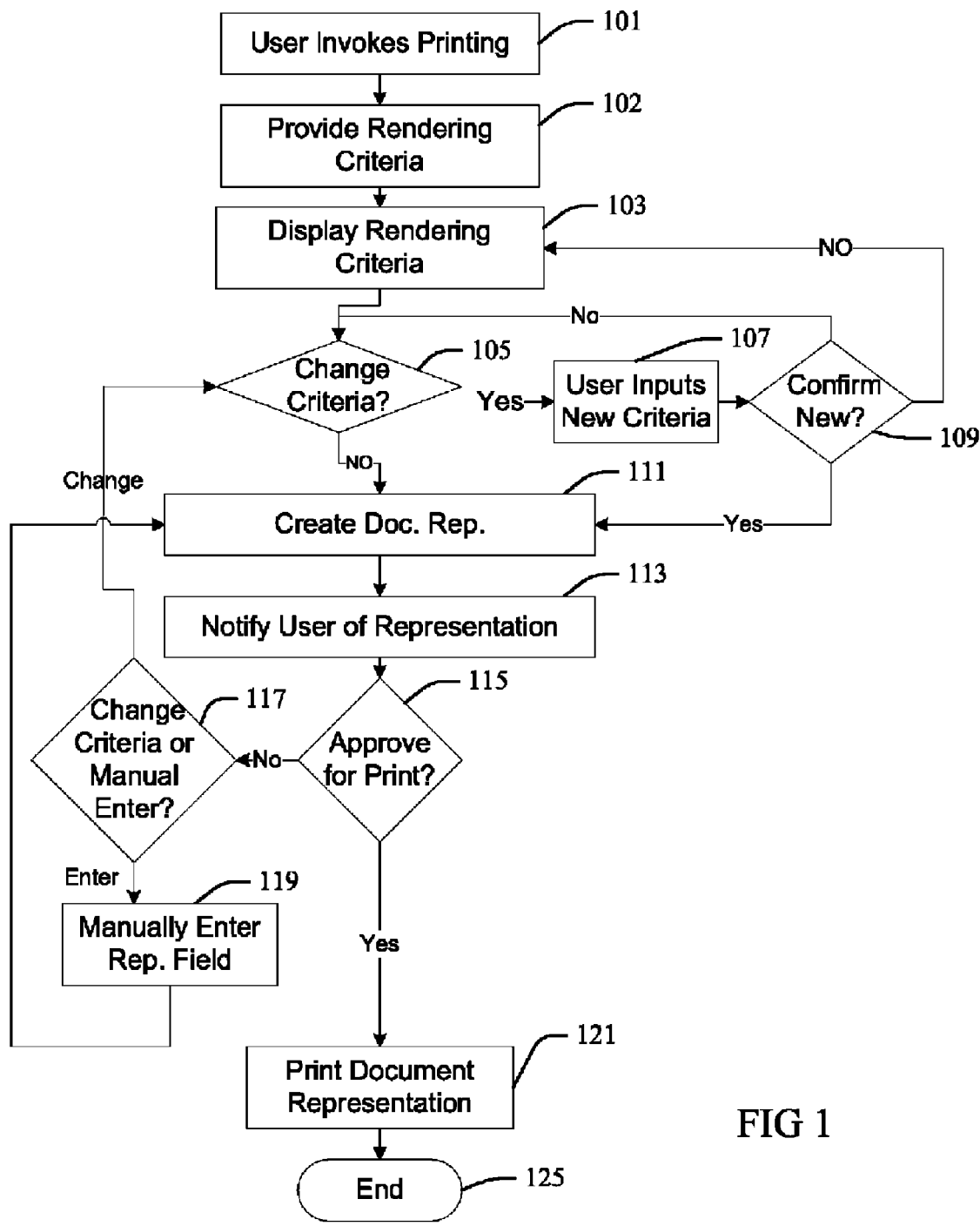
FIG. 1 is a flow chart illustrating a process for reducing an overall energy and resource carbon footprint for printer operations according to the present application.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description
II. Computerized Implementation I. General Description Green computing methods may be implemented to perform computing tasks for a smaller energy and resource footprint. Footprint may be understood as a generic term encompassing a wide variety of energy, resource and emissions requirements and costs associated with affecting a process such as a print operation, for example including a power budget, pollution emissions, and paper and ink and other resource use, and other examples will be apparent to one skilled in the art.

A power budget may consist of the allocation of available electrical power among the various functions that need to be performed. Printers consume a larger quantity of energy while they are being used than when they are suspended or waiting for a print job. Reduced power consumption methods currently include putting a printer in the low-power standby state automatically after a period of inactivity and manually shutting the printer down. To reduce the power consumption of a printer, it is also advantageous or even necessary to reduce the functions that occur on a printer, namely, for example by diminishing unnecessary printing.

The present application describes methods, processes and systems for decreasing a printer's power budget by preventing unintentional waste, which is a common cause of energy and resource waste. For example, a user may attempt to print part of a document, but accidentally print the entire document because of default print operation settings. Individual embodiments and optimizations described by this application may result in relatively minute energy and resource savings per invocation, but the repeated invocation of the described methods may result in larger aggregate or total energy and resource reductions.

FIG. 1 illustrates a method and process for reducing the overall power budget and resource carbon footprint for printer operations. At 101 a user invokes a printing process. Invocation at 101 may occur through a plurality of apparatuses or software programs. Some embodiments are described more fully below and other examples will be apparent to one skilled in the art, while numerous modifications and substitutions are possible without deviating from the claims of the invention. Some embodiments of invoking at 101 include the user selecting "printing" or "print document" through a computer application interface, for example from a dropdown box, by highlighting an icon within the computer desktop or by pressing down a print button on the keyboard which invokes printing for the current application on the computing device.

At 102, print job rendering criteria may be provided. The criteria at 102 may comprise a number of variable values, and examples include limiting the maximum number of pages to print per document and printing only the content likely to be important to the user. Rendering criteria may be fixed at 102, or may be updated or entered by a manufacturer or the user. For example, the user may create a single criterion, a grouping of criteria, or select default criteria recommended by the manufacturer. Criteria may be specified dynamically by the system in some embodiments through artificial intelligence methods and processes, for example, as a user continuously prints the same e-mail document type (e.g. containing the same text phrases and/or concepts), criteria may be changed to incorporate the common aspects of the printed documents. Other embodiments may dynamically limit or expand criteria based on printer characteristics, for example, specifying very narrow and strict rendering criteria as a function of the printer containing low ink quantities or utilizing non-recycled paper.

Rendering criteria may be communicated to a print job requester, for example displayed at 103, wherein in some examples at 105 a user may be prompted to change the displayed default criteria. Some embodiments may automatically select and/or recommend new settings for more energy efficiency and less resource usage as a function of previous printing operations engaged in by the user, enabling the user to select the new criteria or implementing new criteria without prompting the user for selection input at 107. The user may be asked to confirm modifications at 109, and if the user validates, new or modified criteria as provided at 107 are applied to the print job at 111. If the user invalidates the new criteria at 109 with a "no" input, the user is again prompted at 105 to change or accept default criteria. However, it is to be understood that other embodiments may select and apply rendering criteria to limit print job sizes without notification or selection options presented to the user, and thus in some embodiments displaying criteria at 103 and offering users options to change criteria at 105, as well as associated steps at 107 and 109, may be omitted.

The criteria are applied to the print job request to create and print an efficient and/or limited printing of the document request at 111 and 121. In some embodiments the rendering criteria comprise a page limit: for example, requesting a thirty-page print job at 101 may result in an automatic application of a ten-page printout limit criteria specified at 102 and a resultant ten-page printout at 111 and 121; in some embodiments, if the requester desires more printed pages then the requester may initiate another print job affirmatively requesting the additional pages through one or more specific data inputs. In another example a page-limiting representation is set as a default and communicated to a print job requester for an override opportunity before printing: thus a graphical user interface (GUI) application print panel window may show selected and/or default printing setting information to a print job requester for confirmation through clicking on an "OK" GUI button prior to sending the print job to the printer, wherein page-limiting criteria may be selected by default (e.g. "only first ten pages and last page", "two pages per sheet," "nine-point font conversion," etc.), the requester given an opportunity to instead select a larger print job (e.g., "all pages," "one page per sheet," "font specified by document settings") through toggling an alternative radio button in the display.

In other embodiments a representation of the requested print job document may be created as a function of one or more criteria, for example, by analyzing a length and/or content of the document in relation to rendering algorithms which may decompose the document into component parts and create a representation document from rendered components. Document component parts may be any regions or parts of a given document print job. For example, word processor documents may be defined with respect to content components such as main document text bodies, tables of contents, indexes, appendices, acknowledgements, and references, with some rendering criteria differentiating for selection and printing only some word processor document components. Similarly, spreadsheets may be considered as having header, empty and/or populated cell content, sheet and page components as well as others; chains of emails may be broken down into individual emails, subject heading and recipient and sender field components, as well as others; and other print job documents may be broken down into various component elements, as will be appreciated by one skilled in the art. Thus specified criteria may be used to select one or more components for printing from any given print job request, reducing printing resources required for a given printing in proportion to an amount of components excluded in forming a print job representation at 111, for example selecting a single page from a plurality of spreadsheets or multiple pages, or selecting a single e-mail from within a chain of e-mails or other similar types of documents, as representative of the larger document requested at 101.

The user may optionally be notified of a representation of the document at 113 and then prompted to approve a representation at 115, with printing at 121 conditional on the user accepting the representation. If the user invalidates the representation at 115, the user is prompted to either modify rendering criteria or default settings or to manually enter representation directions at 117. If choosing to enter new criteria or default settings at 117, the user is prompted to change the default settings or rendering criteria for entry at 105. Some embodiments at 117 may recommend new settings that may, for example, allow the user to print a longer or shorter document and/or settings which will allow the user to print more or less content for the particular print job.

Where the user manually enters representation directions at 119, embodiments may allow the user to select one or more options from a guided display, for example, by recommending keyword and concept parsing phrases which exist within the document and/or length criteria, based in some examples as a function of a length of the document. A new document representation based on the manually entered representation directions is then created at 111.

Figure 2:
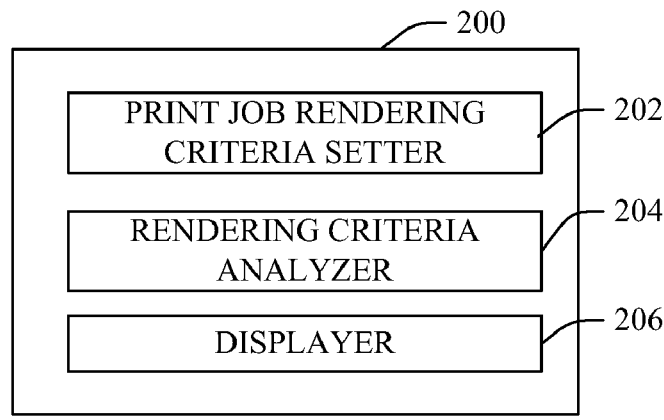
FIG. 2 is block diagram illustrating a system or device for reducing energy and resource footprints for printer operations according to the present application.

FIG. 2 illustrates one embodiment of an Excessive Printing Reducer 200 configured to reduce energy and resource footprints for printer operations, comprising: a Print Job Rendering Criteria Setter 202, a Rendering Criteria Analyzer 204, and a Displayer 206. The Print Job Rendering Criteria Setter 202 sets criteria values for reducing the energy and resource footprint for a printer operation. The Setter 202 may quantify criterion using a variety of methods, for example, the manufacturer creating rendering criteria as a function of the type of device or allowing the end-user to enter specifications, including manually entering representation directions. For some embodiments the Setter 202 may cause a graphical user interface (GUI) system display to provide a menu to a user, for example, allowing the user to select the details and parameters for the existing default criteria, create or enter new criteria or representation directions, or remove an existing criterion from use in some embodiments to reserve it for use at a later time. Some embodiments of the Print Job Rendering Criteria Setter 204 may dynamically create criteria based on the continuously changing elements of the print job arrangement, as discussed previously with regards to FIG. 1.

The Rendering Criteria Analyzer 204 comprises logic components which apply the print job rendering criteria to a document, for example, by analyzing the length and/or content of the document as a function of specified rendering algorithms. Some embodiments of the Rendering Criteria Analyzer 204 decompose the document into component parts and categorize these parts into databases for later extraction and use in compiling a representation document. Other embodiments of the Analyzer 204 include configurations which compare rendering criteria as applied to the current print job with applications to previous print jobs where representation documents were created. The Rendering Criteria Analyzer 204 may also create a representation document, as discussed previously with respect to the process and system of FIG. 1.

The Displayer 206 displays documents representations, and in some examples notifications, prompts and data entry areas to the user. One embodiment creates a dedicated display on a computational device which exhibits all of the available rendering criteria that may affect the printing operation for a given print job. Additional embodiments of the Displayer 206 include web-based applications that, for example, allow the user to print from any computer application and apply the rendering criteria to whatever type of document the user has created, for example, a spreadsheet, a series of envelopes or mailing labels, postcards, or presentations.

In some embodiments, the system may default to printing only a subset of a document, and require the user to override the criterion to print the entire document, for example, printing the first page of the document, printing the page last edited by a user, printing only the visible page, or printing the visible page along with the page before and the page after. Embodiments may also include prompting the user for confirmation upon invoking large print operations. More particularly, the system may detect the length of a print operation and if the operation exceeds a specified size, the system may require confirmation before continuing printing, for example, visually requesting the user to select "yes" on a general user interface for the large print operation. Some embodiments may communicate to the user the length of the requested operation and if no confirmation or acknowledgement is made, the system may (automatically) perform one or more of alternative print operations, for example, printing the first page of the document or printing the last edited page.

Other embodiments may reduce print output by automatic document selection, for example in a background process independent of user confirmations or other affirmative actions. The methods proposed may be used alone, in conjunction with one another (for example combining user-confirmation processes with automatic/background processes), or combined with other rendering criteria.

In some embodiments, in response to originating e-mail criterion the rendering may comprise selecting for printing e-mail subsets from which a chain of related e-mails originated. More specifically, a chain of related e-mails generally includes replies to the original e-mail as well as forwards of an e-mail to any one or more destination fields (e.g. to, cc, bcc). For example, an original e-mail is sent from party A to party B, who then replies to A, quoting the original e-mail. Party A then forwards the e-mail to party C who selects to print the e-mail. In one example, only the original e-mail from party A will be printed as a print job rendering, the criteria excluding intervening emails, in one aspect through a determination that the intervening emails have a low probability of relevance or importance, and thus their exclusion creates print job efficiencies of higher value than the presumed worth of excluded emails to the print job user or receiver.

A reference e-mail criterion may also be used to select one or more e-mails for printing from a chain of e-mails, based on the references in the e-mail. Some embodiments may apply text and concept mining protocol to select a pertinent e-mail, where text mining may involve deriving patterns from structured data, then evaluating and interpreting the patterns to select text items following an algorithm, in one example the algorithm combining aspects of relevancy, novelty, and interest. Examples of text mining methods and processes include text clustering (classifying text that shares a common trait into subsets), part-of-speech tagging (classifying words into categories such as noun, verb, and adjective), producing granular taxonomies (measuring the size of text components or descriptions that make up the document and creating a hierarchical classification based on the measurements), named-entity recognition (identifying names in a document, such as organization or personal names, and also recognizing expressions of time, associated units, and percentages). Other text mining methods and processes appropriate for use according to the present application will also be apparent to one skilled in the art.

Concept mining may also use linguistic analysis and word association techniques to create word mappings which provide insight into the meaning, provenance, and similarity of documents. Tasks typically include word sense disambiguation (identifying the meaning of a word given its usage, from among the multiple meanings the word may have), grammatical analysis of sentences (creating complete representations of the structure of sentences), term analysis (identifying the terms in a document that may consist of one or more words), and fact extraction (identifying and extracting relationships generally between entities and events).

Thus subsets of emails from a chain of emails may be selected, and document summarizations performed (for example, creating a shortened version of selected text while keeping the integral points from the original text) as a function of analyses, mappings and frequencies of occurrence of integral points, such as patterns, text clustering, speech tagging, taxonomies, entity recognition and other text and concept mining method and process criteria. In some embodiments reference e-mail criteria may be applied to analyze e-mails in forward or reverse chronological order until a reference to a previous e-mail within the chain. Text and/or concept mining may be applied using keywords or phrases to act as references, for example, "see/note/look the e-mail from", "see/note/look the original e-mail from", "the original/first e-mail", "the second e-mail", "the e-mail about", and "the e-mail from/sent at."

Keywords or phrases may be used with text and/or concept mining methods to select e-mails from a chain. For example, if an e-mail being analyzed contains the text "see the original e-mail from Bob" an associated-text method would look for an e-mail in the chain written by someone with the first or last name of "Bob" in the 'from' field. In some embodiments, if unable to find a match in the 'from' field, an associated method may scan the e-mail, for example, looking for an e-mail signature containing the first or last name of "Bob." In another example, if an e-mail being analyzed contains the phrase "the e-mail sent at 12:00 below," an associated-text method may scan the e-mail thread and select the e-mail sent at 12:00. Some embodiments, if unable to find an exact match, may expand a matching time frame until able to find a match, for example, by selecting an e-mail sent at 12:02 instead of the specified 12:00.

Application of a reference e-mail criteria may also include analyzing a chain of e-mails and keeping a count of references to other e-mails within the chain, then printing the e-mail most referenced within the chain: for example, if A sends the same e-mail to B, C, and D, and each sends an e-mail referencing A's e-mail to E, only the original e-mail from A will be printed because it has the highest reference count.

Largest document or other size criteria may also be implemented. In one embodiment a largest document with the highest determined weight value may be selected for printing, for example further selecting a single page from a plurality of spreadsheets or multiple pages, or selecting a single e-mail from within a chain of e-mails or other similar types of documents, as representative of the large document. In another example, in response to a user requesting a print job comprising multiple large e-mail documents which reference other e-mails within a chain, the process may select e-mails complying with criteria comprising "maximum document length=10 pages" and a frequency threshold of at least one occurrence of a reference keyword phrase "the second e-mail about."

Document and document portion selection may also be a function of weighted criteria values. To obtain the weight value for each document or portion thereof, one or a combination of counting methods may be used to analyze a document, for example by determining the number of lines a document consists of, summing the number of characters and/or symbols contained within a document, or calculating the computing memory space occupied by the document, with weighting assigned accordingly.

A print section determining criteria may be applied to select and print only document pages or portions where selected information is contained or selected important data is referenced. More particularly, it is known for spreadsheet and database applications to print more pages than needed or desired because of formatting details, for example, actual data entries may fit on a single printer page, yet, the print operation may extend for extra pages due to cell arrangement or inadvertent user-selected parameters. This attribute of the present application (individual empty cells and/or pages that consist of entirely blank cells or blank cells with defined outline) may be detected and printing thereof prevented.

The print section determining criteria may also limit or exclude printing of text document sections distinct from main document text bodies, for example excluding tables of contents, indexes, appendices, acknowledgements, and references, in some embodiments offering separate print jobs for the identified and excluded portions. Embodiments may note and exclude print sections designated by an author through the word-processor controls and/or tags (such as styles): for example, comment section indicators may be used to suppress the printing of comments. In some embodiments, the sections to skip may be selected by the user or default sections to skip may be provided by the operating system or application. Other embodiments may allow a new skip-capable section to be used and/or added to those already available.

Figure 4:
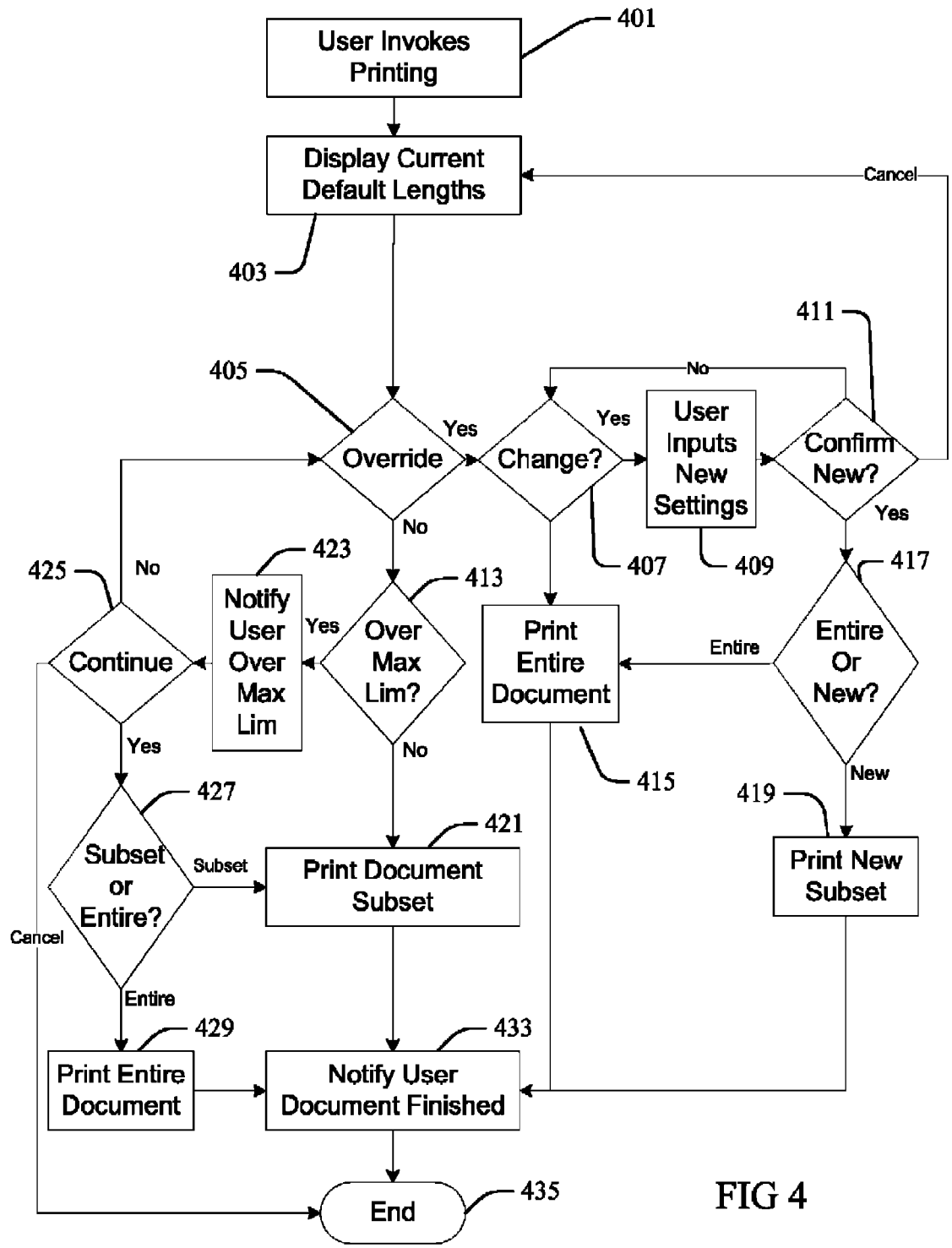
FIG. 4 is a flow chart illustrating one embodiment for reducing the overall energy and resource carbon footprint for printer operations according to the present application.

FIG. 4 illustrates one embodiment for reducing the overall energy and resource footprint for printer operations by applying the print job rendering criteria to limit the maximum number of pages to print by creating a document subset. At 401 the user invokes the printing process, for example as described previously in reference to FIG. 1. At 403 the current default printing lengths are displayed for the user. A maximum document threshold criterion may limit any printing job regardless of the actual length of the document, for example, to a set number of pages. The maximum threshold and the actual document length may be counted or calculated, for example, from the first page of the document, the last page of the document, or by some similar counting method which accurately portrays the document. A document subset criterion may also be used to keep the document length within the maximum limit threshold. The subset may be, for example, a function of the total number of pages of the print job or be specifically defined, such as the first page of the document, the last page edited by the user, and the visible page. In some embodiments the document length criteria may be dynamically modified by the given printer's characteristics, as discussed previously with reference to FIG. 1.

In some embodiments the display at 403 may show only the default settings or conditions, for example, "subset length=50% of document" and "maximum number of pages to print=30 pages." Other embodiments of the display at 403 may additionally include the parameters of the current document, for example, "current document=40 pages," and include the subset length for the current document, for example, "current document subset length=20 pages."

At 405 the user is prompted to override the current default settings. If overriding the default settings at 405 the user is prompted at 407 to either print the entire document, change the current default settings, or to create new default settings. If choosing to print the entire document, the document without limitation is printed at 415, the user is notified when the print job is finished at 433 and the system ends at 435.

If choosing to set new rendering criteria at 409, some embodiments may allow the user to manually input new criteria or may display dynamic recommendations that are continually created based on the previous print operations within the system, as discussed previously with regards to FIG. 1. The user is then prompted to confirm the new settings at 411. If the user chooses to invalidate the newly entered settings, he or she is again prompted to change the settings at 409. The user may also cancel at 411, and be displayed the current default settings again at 403.

Upon confirmation at 409, the user is prompted at 417 to print under the newly set default criteria or to print the entire document. If printing under the new criteria, a new document subset is created by applying the newly designated rendering criteria as discussed previously under FIGS. 1 and 2, and printed at 419. The user is notified of the finished print at 433 and the system ends at 435.

If at 405 the user continues to print without overriding the default settings a query is made at 413 to determine if the document subset is over the maximum limit threshold. In some embodiments, determination at 413 may include the comparison of the existing subset length against the maximum limit threshold. Additional embodiments may create the subset as a function of the comparison to the maximum limit threshold, for example, if the maximum limit is set at 20 pages and the default subset length is 75%, a 30 page subset may be reduced to 20 pages to fit within the predetermined threshold.

If the given document subset is over the default maximum limit threshold at 413, the user is notified at 423. This notification may be similar to displays and communications discussed previously with regards to FIGS. 1 and 2. At 425 the user is prompted to either continue with printing at 427, override the current default settings at 405, or to cancel and end the system at 435.

If choosing to continue with printing, the user is prompted at 427 to print the over-length subset or the entire document. If printing the subset at 421, the user is notified when printed at 433 and the system ends at 435. If printing the entire document at 429, the user is similarly notified at 433 and the system ends at 435. The user may also choose to print the entire document at 429, be notified when printing is finished at 433, and the system ending at 435. If choosing to cancel at 425, in some embodiments the system may end at 435, for example, automatically or after notifying the user that printing has been cancelled. Additional embodiments may notify the user of ways to fit the current document within the threshold, for example, by recommending new default settings or additional ways to edit the document.

If the given document subset at 413 is below the maximum limit threshold, the subset is printed at 421, the user notified once printing is finished at 433 and the system ends at 435.

II. Computerized Implementation

Figure 3:
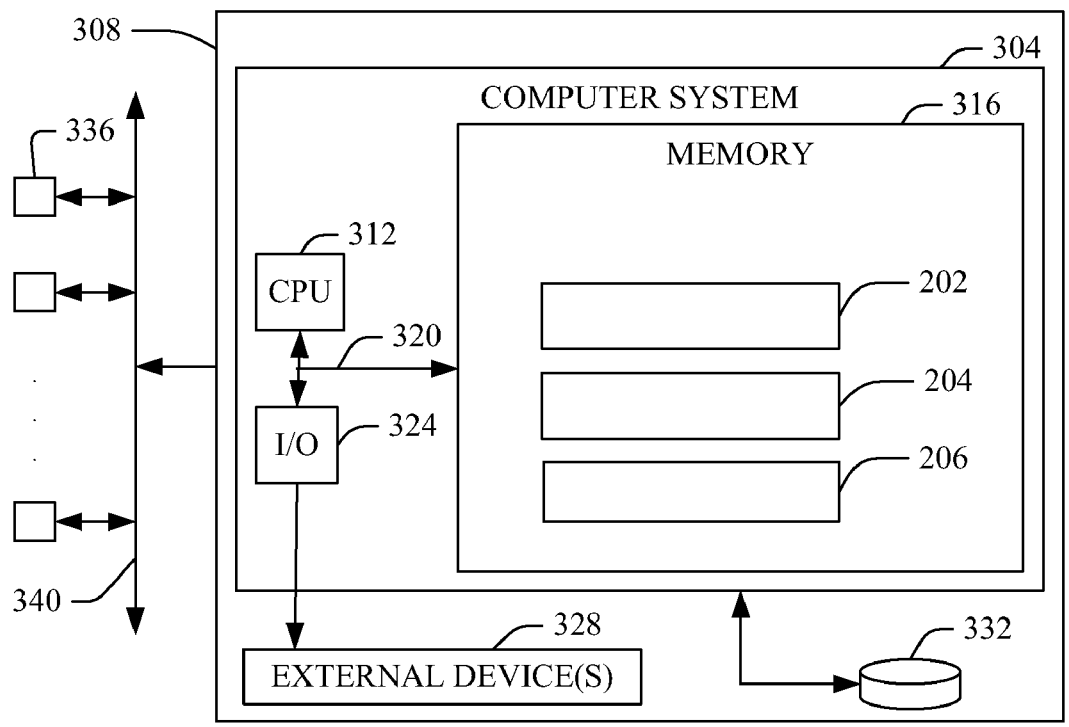
FIG. 3 is a block diagram illustrating an exemplary computerized implementation of a process and system for reducing an overall energy and resource footprint for printer operations according to the present application.

Referring now to FIG. 3, an exemplary computerized implementation includes a computer system 304 deployed within a computer infrastructure 308 such as a computer or a programmable device. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to reduce the overall energy and resource carbon footprint for printer operations as illustrated in FIGS. 1 and 2 and described above, including the Print Job Rendering Criteria Setter 202, the Rendering Criteria Analyzer 204, and the Displayer 206 components discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement the overall energy and resource carbon footprint savings for printer operations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure, such as the computer infrastructure 308 that performs the process steps of the invention for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for reducing the overall energy and resource carbon footprint for printer operations. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for reducing resource footprints for printer operation outputs, comprising:

in response to receiving a request from a print job requestor to print a print job comprising a plurality of different components and a page number amount that is in excess of a maximum number of pages to print per print job as specified by a print job rendering criteria of a printing device, wherein the print job rendering criteria specifies a print job element selection criteria, the printing device automatically:

analyzing the print job as a function of the print job rendering criteria to identify a relevance of each of the plurality of print job components to the specified print job element selection criteria;

selecting a subset portion of the print job comprising a subset of the analyzed plurality of components that are identified as relevant to the specified print job element selection criteria; and printing a representation of the print job comprising only the subset portion of the print job, wherein the subset portion has a page number amount smaller than the print job page number amount and less than or equal to the maximum number.

2. The method of claim 1, further comprising:

dynamically revising the specified maximum number of pages to print per print job of the print job rendering criteria as a function of determining a resource characteristic of the printing device; and wherein the determined resource characteristic is at least one of a low ink quantity and a utilizing of non-recycled paper by the printer.

3. The method of claim 1, further comprising:
notifying the print job requester that the step of printing only the subset portion of the print job is pending; and
enabling the print job requester to override the pending subset portion printing and instead cause a printing of the requested print job or another version of the requested print job, the another version having a page number amount different from the subset portion page number amount and the requested print job page number amount.

4. The method of claim 1, wherein the print job is a document and the plurality of different print job document components comprises a main text body component and at least one of a table of contents component, an index component, an appendix component, an acknowledgements component, and a references component; and
wherein the representation of the print job comprises the main text body component and does not include, at least one of the table of contents component, the index component, the appendix component, the acknowledgements component, and the references component.

5. The method of claim 1, wherein the step of the printing device automatically analyzing the print job to identify the relevance of each of the plurality of print job components to the specified print job element selection criteria further comprises:
deriving patterns from structured data in the print job; and
evaluating and interpreting the derived patterns to select text items relevant, novel or of interest in view of the specified print job element selection criteria; and
wherein the creating the representation comprises selecting the subset of the plurality of print job components that have evaluated and interpreted derived patterns in the structured data selected as relevant, novel or of interest in view of the specified print job element selection criteria.

6. The method of claim 5, wherein the specified print job element selection criteria is a key word or key phrase.

7. The method of claim 5, wherein the print job comprises a chain of a plurality of emails and the plurality of print job components are individual emails in the chain, wherein the printing device automatically analyzing the print job to identify the relevance of each of the individual emails to the specified print job element selection criteria comprises determining if the specified print job element selection criteria is contained within the individual emails, and wherein the representation excludes at least a one of the individual emails of the chain of emails.

8. The method of claim 1, wherein the steps of automatically selecting and printing the subset portion of the print job comprises selecting and printing at least one of:
a page last edited by the requestor; and
a page visible to the requestor on a graphical user interface application display during the request to print the print job, along with a page before and a page after the visible page.

9. A service for reducing resource footprints for printer operation outputs, comprising:
providing a computer infrastructure that:
in response to receiving a request from a print job requestor to print a print job comprising a plurality of different components and a page number amount that is in excess of a maximum number of pages to print per print job as specified by a print job rendering criteria of a printing device, wherein the print job rendering criteria specifies a print job element selection criteria, automatically;
analyzes the print job as a function of the print job rendering criteria to identify a relevance of each of the plurality of print job components to the specified print job element selection criteria;
selects a subset portion of the print job comprising a subset of the analyzed plurality of components that are identified as relevant to the specified print job element selection criteria; and
prints a representation of the print job comprising only the subset portion of the print job, wherein the subset portion has a page number amount smaller than the print job page number amount and less than or equal to the maximum number.

10. The service of claim 9, wherein the computer infrastructure further:
dynamically revises the specified maximum number of pages to print per print job of the print job rendering criteria as a function of determining a resource characteristic of the printing device, wherein the determined resource characteristic is at least one of a low ink quantity and a utilizing of non-recycled paper by the printer;
the print job requestor of a pending of a printing of only the subset portion of the print job; and
enables the print job requestor to override the pen in a subset portion printing and instead cause a printing of the requested print job or another version of the requested print job, the another version having a page number amount different from the subset portion page number amount and the requested print job page number amount.

11. The service of claim 9, wherein the computer infrastructure:
analyzes the print job to identify the relevance of each of the plurality of print job components to the specified print job element selection criteria by:
deriving patterns from structured data in the print job; and
evaluating and interpreting the derive patterns to select text items relevant, novel or of interest in view of the specified print job element selection criteria; and
creates the representation by selecting the subset of the plurality of print job components that have evaluated and interpreted derived patterns in the structured data selected as relevant, novel or of interest in view of the specified print job element selection criteria, and wherein the document element is a key word or key phrase.

12. An article of manufacture, comprising:
a computer readable storage device having a computer executable program code stored thereon, the program code comprising instructions which, when executed on a computer system, cause toe computer system to,
in response to receiving a request from a print job requestor to print a print job comprising a plurality of different components and a page number amount that is in excess of a maximum number of pages to print per print job as specified by a print job rendering criteria of a printing device, wherein the print job rendering criteria specifies a print job element selection criteria, automatically;
analyze the print job as a function of the print job rendering criteria to identify a relevance of each of the plurality of print job components to the specified print job element selection criteria;

select a subset portion of the print job comprising a subset of the analyzed plurality of components that are identified as relevant to the specified print job element selection criteria; and print a representative of the print job comprising only the subset portion of the print job, wherein the subset portion has a page number amount smaller than the print job page number amount and less than or equal to the maximum number.

13. The article of manufacture of claim 12, the program code comprising instructions which, when executed on the computer, system, further cause the computer system to:

dynamically revise the specified maximum number of pages to print per print job of the print job rendering criteria as a function of determining a resource characteristic of a printer, wherein the determined resource characteristic is at least one of a low ink quantity and a utilizing of non-recycled paper by the printer;

notify the print job requestor of a pending of a printing of only the subset portion of the print job; and enable the print job requestor to override the pending subset portion printing and instead cause a printing of the requested print job or another version of the requested print job, the another version having a page number amount different from the subset portion page number amount and the requested print job page number amount.

14. The article of manufacture of claim 12, wherein the print job is a document and the plurality of different print job document components comprises a main text body component and at least one of a table of contents component, an index component, an appendix component, an acknowledgements component, an references component; and wherein the representation of the print job comprises the main text body component and does not include at least one of the table of contents component, the index component, the appendix component, the acknowledgements component, and the references component.

15. The article of manufacture of claim 12, the program code comprising instructions which, when executed on the computer system, further cause the computer system to:

analyze the print job to identify the relevance of each of the plurality of print job components to the specified print job element selection criteria by:

deriving patterns from structured data in the print job; and evaluating and interpreting the derived patterns to select text items relevant, novel or of interest in view of the specified print job element selection criteria; and create the representation by selecting the subset of the plurality of print job components that have evaluated and interpreted derived patterns in the structured data selected as relevant, novel or of interest in view of the specified print job element selection criteria, and wherein the document element is a key word or key phrase.

16. A programmable device comprising:

a processing means;

a memory in communication with the processing means comprising a print job rendering logic component; and a network interface in communication with the processing means and the memory;

wherein the programmable device;

analyzes a print job request comprising a plurality of different components and a page number amount to determine if the print job request page number amount is in excess of a maximum number of pages to print per print job as specified by a print job rendering criteria of a printer, wherein the print job rendering criteria specifies a print job element selection criteria;

analyzed the print job as a function of the pint job rendering criteria to identity a relevance of each of the plurality of print job components to the specified print job element selection criteria;

automatically selects subset portion of the print job comprising a subset of the analyzed plurality of components that are identified as relevant to the specified print job element selection criteria; and prints a representation of the print job comprising only the subset portion of the print job as a function of the analyzing the print job wherein the subset portion has a page number amount smaller than the print job page number amount and less than or equal to the maximum number.

17. The programmable device of claim 16, which further:

dynamically revises the specified maximum number of pages to print per print job of the pint job rendering criteria as a function of determining a resource characteristic of the printer; and wherein the determined resource characteristic is at least one of a low ink quantity and a utilizing of non-recycled paper by the printer.

18. The programmable device of claim 17, which further:

analyzes the print job as a function of the print job rendering criteria to identify a relevance of each of the plurality of print job components to the specified document element criteria by:

deriving patterns from structured data in the print job; and evaluating and interpreting the derived patterns to select text items relevant, novel or of interest in view of the specified print job element selection criteria; and creates the subset portion of the print job by selecting a subset of the plurality of print job components that have evaluated and interpreted derived patterns in the structured data selected as relevant, novel or of interest in view of the specified print job element selection criteria.

19. The programmable device of claim 18, wherein the specified print job element selection criteria is a key word or key phrase.

* * * * *